United States Patent
Branch et al.

(10) Patent No.: US 12,328,357 B2
(45) Date of Patent: *Jun. 10, 2025

(54) VIRTUAL PRIVATE NETWORK (VPN) WHOSE TRAFFIC IS INTELLIGENTLY ROUTED

(71) Applicant: CLOUDFLARE, INC., San Francisco, CA (US)

(72) Inventors: Christopher Philip Branch, Romford (GB); Naga Sunil Tripirineni, San Jose, CA (US); Rustam Xing Lalkaka, San Francisco, CA (US); Nick Wondra, Champaign, IL (US); Mohd Irtefa, Austin, TX (US); Matthew Browning Prince, San Francisco, CA (US); Andrew Taylor Plunk, Austin, TX (US); Oliver Yu, Austin, TX (US); Vlad Krasnov, New York, NY (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,265

(22) Filed: Jan. 22, 2024

(65) Prior Publication Data

US 2024/0163350 A1 May 16, 2024

Related U.S. Application Data

(63) Continuation of application No. 17/893,003, filed on Aug. 22, 2022, now Pat. No. 11,882,199, which is a (Continued)

(51) Int. Cl.
*H04L 12/721* (2013.01)
*H04L 9/40* (2022.01)
(Continued)

(52) U.S. Cl.
CPC .......... *H04L 67/10* (2013.01); *H04L 12/4633* (2013.01); *H04L 12/4641* (2013.01);
(Continued)

(58) Field of Classification Search
CPC . H04L 67/63; H04L 12/4633; H04L 12/4641; H04L 63/0272; H04L 67/10; H04L 12/721; H04L 29/12; H04L 45/02
(Continued)

(56) References Cited

U.S. PATENT DOCUMENTS 6,751,729 B1   6/2004 Giniger et al.
7,254,634 B1   8/2007 Davis et al.
(Continued)

OTHER PUBLICATIONS

Lalkaka, Rustam, "Introducing Argo—A faster, more reliable, more secure Internet for everyone", Cloudflare, Available Online at <https://blog.cloudflare.com/argo/>, May 18, 2017, pp. 1-9.
(Continued)

*Primary Examiner* — Jude Jean Gilles
(74) *Attorney, Agent, or Firm* — NICHOLSON DE VOS WEBSTER & ELLIOTT LLP

(57) ABSTRACT

A request is received from a client device over a Virtual Private Network (VPN) tunnel. The request is received at a first one of a plurality of edge servers of a distributed cloud computing network. A destination of the request is determined and an optimized route for transmitting the request toward an origin server is determined. The optimized route is based at least in part on probe data between edge servers of the distributed cloud computing network. The request is transmitted to a next hop as defined by the optimized route.

21 Claims, 4 Drawing Sheets

Related U.S. Application Data continuation of application No. 16/836,613, filed on Mar. 31, 2020, now Pat. No. 11,425,216.

(60) Provisional application No. 62/827,812, filed on Apr. 1, 2019.

(51) Int. Cl.
*H04L 12/46* (2006.01)
*H04L 29/12* (2006.01)
*H04L 45/02* (2022.01)
*H04L 67/10* (2022.01)
*H04L 67/63* (2022.01)

(52) U.S. Cl.
CPC .......... *H04L 45/02* (2013.01); *H04L 63/0272* (2013.01); *H04L 67/63* (2022.05)

(58) Field of Classification Search
USPC ........................................................ 709/219
See application file for complete search history.

(56) References Cited

U.S. PATENT DOCUMENTS

| | | | |
|---|---|---|---|
| 7,783,777 | B1 | 8/2010 | Pabla et al. |
| 8,819,187 | B1 | 8/2014 | Hofmann |
| 9,419,845 | B2 | 8/2016 | Wainner et al. |
| 9,635,705 | B2 | 4/2017 | Lu et al. |
| 9,736,710 | B2 | 8/2017 | Kim et al. |
| 10,374,953 | B1 | 8/2019 | Branch et al. |
| 10,659,256 | B2 | 5/2020 | Ore et al. |
| 10,687,188 | B2 | 6/2020 | Kim et al. |
| 11,115,480 | B2 | 9/2021 | Markuze et al. |
| 11,425,216 | B2 * | 8/2022 | Branch .................. H04L 67/63 |
| 11,882,199 | B2 * | 1/2024 | Branch .................. H04L 67/10 |
| 2003/0174648 | A1 | 9/2003 | Wang et al. |
| 2006/0159039 | A1 | 7/2006 | Jung et al. |
| 2006/0182034 | A1 * | 8/2006 | Klinker ................. H04L 45/123 |
| | | | 370/248 |
| 2007/0153782 | A1 | 7/2007 | Fletcher et al. |
| 2007/0248091 | A1 | 10/2007 | Khalid et al. |
| 2008/0259944 | A1 | 10/2008 | Raghunath et al. |
| 2009/0034418 | A1 | 2/2009 | Flammer et al. |
| 2009/0034419 | A1 | 2/2009 | Flammer et al. |
| 2011/0225311 | A1 * | 9/2011 | Liu ....................... H04L 45/125 |
| | | | 709/231 |
| 2011/0225312 | A1 * | 9/2011 | Liu ....................... H04L 65/752 |
| | | | 709/231 |
| 2013/0010621 | A1 | 1/2013 | Yoshiuchi et al. |
| 2013/0205025 | A1 | 8/2013 | Shamsee et al. |
| 2014/0105174 | A1 | 4/2014 | Agrawal et al. |
| 2014/0259109 | A1 | 9/2014 | Houston et al. |
| 2015/0039881 | A1 | 2/2015 | Scheidt et al. |
| 2015/0295888 | A1 | 10/2015 | Maslak |
| 2015/0373688 | A1 * | 12/2015 | Samuel Raj .......... H04L 63/108 |
| | | | 370/329 |
| 2016/0119279 | A1 | 4/2016 | Maslak et al. |
| 2016/0191651 | A1 | 6/2016 | Balakrishnan et al. |
| 2016/0191664 | A1 | 6/2016 | Balakrishnan et al. |
| 2016/0380975 | A1 | 12/2016 | Reddy et al. |
| 2017/0026461 | A1 | 1/2017 | Boutros et al. |
| 2017/0063674 | A1 | 3/2017 | Maskalik et al. |
| 2017/0195161 | A1 | 7/2017 | Ruel et al. |
| 2018/0103013 | A1 | 4/2018 | Imai et al. |
| 2018/0115547 | A1 | 4/2018 | Peterson et al. |
| 2018/0176121 | A1 * | 6/2018 | Jayaraman .............. H04L 45/00 |
| 2018/0212876 | A1 * | 7/2018 | Bacthu .................. H04L 45/748 |
| 2018/0248876 | A1 | 8/2018 | Sakura et al. |
| 2018/0278688 | A1 | 9/2018 | Gal et al. |
| 2018/0376338 | A1 | 12/2018 | Ashrafi |
| 2019/0141015 | A1 | 5/2019 | Nellen |
| 2019/0235714 | A1 | 8/2019 | Bilange et al. |
| 2019/0238449 | A1 | 8/2019 | Michael et al. |
| 2019/0246160 | A1 | 8/2019 | Williams et al. |
| 2019/0260599 | A1 | 8/2019 | Williams et al. |
| 2019/0339840 | A1 | 11/2019 | Park et al. |
| 2020/0136862 | A1 | 4/2020 | Jain et al. |
| 2020/0137192 | A1 * | 4/2020 | Ioannidis .............. H04L 45/127 |
| 2020/0314212 | A1 | 10/2020 | Branch et al. |

OTHER PUBLICATIONS

Non-Final Office Action, U.S. Appl. No. 16/836,613, Oct. 6, 2020, 9 pages.

Non-Final Office Action, U.S. Appl. No. 17/893,003, May 10, 2023, 7 pages.

Notice of Allowance, U.S. Appl. No. 16/836,613, Apr. 26, 2022, 9 pages.

Notice of Allowance, U.S. Appl. No. 16/836,613, Apr. 19, 2021, 9 pages.

Notice of Allowance, U.S. Appl. No. 16/836,613, Aug. 17, 2021, 9 pages.

Notice of Allowance, U.S. Appl. No. 16/836,613, Dec. 14, 2021, 9 pages.

Notice of Allowance, U.S. Appl. No. 17/893,003, Sep. 29, 2023, 8 pages.

\* cited by examiner

VIRTUAL PRIVATE NETWORK (VPN) WHOSE TRAFFIC IS INTELLIGENTLY ROUTED

CROSS-REFERENCE TO RELATED APPLICATIONS

This application is a continuation of Ser. No. 17/893,003, filed Aug. 22, 2022, which is a continuation of U.S. application Ser. No. 16/836,613, filed Mar. 31, 2020, now U.S. Pat. No. 11,425,216, which claims the benefit of U.S. Provisional Application No. 62/827,812, filed Apr. 1, 2019, which is hereby incorporated by reference.

FIELD

Embodiments of the invention relate to the field of computing; and more specifically, to a Virtual Private Network (VPN) whose traffic is intelligently routed to its destination.

BACKGROUND

A Virtual Private Network (VPN) is an internet security service that allows users to access the Internet as though they were connected to a private network. A VPN service allows a user to encrypt Internet communications and provide the user with a strong degree of anonymity when browsing the Internet. Users may use a VPN service to protect themselves against eavesdropping that may occur on public Wi-Fi, to circumvent Internet censorship, or to connect to a business's internal network for the purpose of remote work.

Establishing a VPN tunnel between two network nodes involves establishing and maintaining a logical network connection (the logical network connection can be referred to as a VPN connection). The VPN connection between two network nodes may contain intermediate hops. In the VPN connection, packets constructed in a given VPN protocol format are encapsulated within another carrier protocol. The VPN packets are then transmitted between VPN client and server and de-encapsulated on the receiving end.

For Internet-based VPNs, packets in a VPN protocol are encapsulated within Internet Protocol (IP) packets. VPN protocols also support authentication and encryption to keep the tunnels secure. Thus, a VPN is a network tunneled within another network (e.g., within the IP network).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
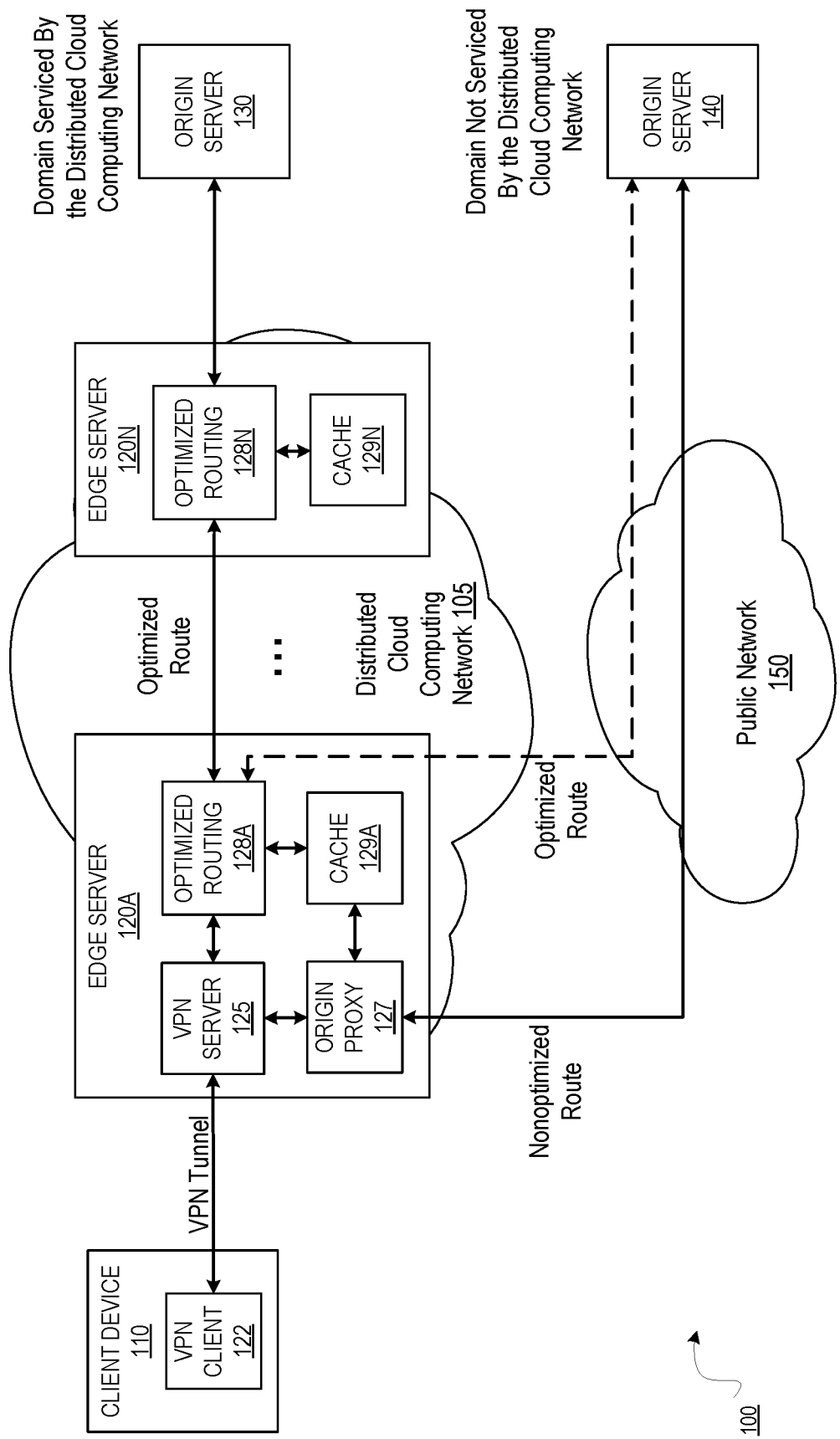
FIG. 1 illustrates an exemplary system for a VPN client whose traffic is intelligently routed according to an embodiment.

A method and apparatus for a Virtual Private Network (VPN) whose traffic is intelligently routed to its destination is described. In an embodiment, a client device includes a VPN application that intercepts each outgoing request and transmits the request over a tunnel to a first edge server of a distributed cloud computing network. This tunnel is a secure connection between the client device and the first edge server that can be reused for subsequent requests and responses. The first edge server is one of multiple servers of the distributed cloud computing network that are geographically distributed (e.g., in different locations throughout the world). There may be hundreds to thousands of servers of the distributed cloud computing network. The first edge server may be the edge server that connects with the client device over the VPN tunnel because it is the edge server that is closest to the client device in terms of routing protocol configuration (e.g., Border Gateway Protocol (BGP) configuration) according to an anycast implementation as determined by the network infrastructure (e.g., router(s), switch(es), and/or other network equipment).

The request from the client device may be destined to an origin server. An origin server is a computing device on which a network resource resides and/or originates (e.g., web pages, images, word processing documents, PDF files movie files, music files, or other computer files). The origin server handles traffic for one or more domains. A domain owner may or may not be a customer of the distributed cloud computing network where traffic may be terminated at an edge server of the distributed cloud computing network.

The first edge server may intelligently route the request towards the origin server, based on a set of factors such as speed, reliability, and/or cost. This allows for improvement, for example, in the Time to First Byte (TTFB) and/or round-trip latency. The request may transit through one or more servers of the distributed cloud computing network before reaching the origin server. Before determining to transmit the request to another server of the distributed cloud computing network or to the origin server, the first edge server (and optionally other servers of the distributed cloud computing network) determines whether the requested resource is available in cache, and if so, return the requested resource without querying the origin server or another server.

In an embodiment, the intelligent routing is based on network probe data to calculate the routes to take. The network probe data may include probe data for server-to-server links (servers of the distributed cloud computing network) and/or probe data for server-to-origin links. The probe data for server-to-server links and the probe data for server-to-origin links may determine (at a particular time) for each link, the Transmission Control Protocol (TCP) average round trip time (RTT), the TCP minimum RTT, the TCP maximum RTT, the TCP median RTT, and the TCP standard deviation.

FIG. 1 illustrates an exemplary system for a VPN client whose traffic is intelligently routed according to an embodiment. The system 100 includes the client device 110, the edge servers 120A-N that are part of the distributed cloud computing network 105, the origin server 130, and the origin server 140.

The client device 110 is a computing device (e.g., laptop, workstation, smartphone, palm top, mobile phone, tablets, gaming system, set-top box, etc.) that is capable of accessing network resources through a client network application (e.g., a browser, a mobile application, or other network application). The client device 110 includes a VPN client 122 that is operative to establish a VPN connection with one or more servers. As illustrated in FIG. 1, the VPN client 122 establishes a VPN tunnel with the VPN server 125 of the edge server 120A of the distributed cloud computing network 105. The VPN client 122 intercepts outgoing traffic and transmits the traffic over the VPN tunnel to the VPN server 125. While a single client device is illustrated, any number of client devices can be in communication with each one of the servers 120A-N.

The VPN client 122 registers with the system. For instance, the VPN client 122 generates a random keypair (public key and private key) and the public key is stored in a public key server (which may or may not be part of the distributed cloud computing network 105). Prior to accepting a connection from the VPN client 122, the VPN server 125 verifies the public key of the VPN client 122 with the key server (if it is not valid the connection will be dropped). In an embodiment, during registration, an initial VPN route configuration may be transmitted to the VPN client 122 that specifies the edge server 120A as the endpoint of the VPN tunnel. In another embodiment, the initial VPN route configuration specifies the anycast IP address shared between the edge servers 120A-N. The edge server 120A connects to the VPN client 122 because it is the one of the edge servers 120A-N that is closest to the client device 110 in terms of routing protocol configuration (e.g., BGP configuration) according to an anycast implementation.

The edge server 120A is one of multiple edge servers 120A-N of the distributed cloud computing network 105. Each edge server 120 is a computing device that is part of the distributed cloud computing network 105. The distributed cloud computing network 105 may provide multiple services for customers (e.g., domain owners). Web traffic (e.g., HTTP/S requests/responses, SPDY requests/responses, other web traffic) may be received and processed through the distributed cloud computing network 105. The edge servers 120A-N are geographically distributed (e.g., in different locations throughout the world). There may be hundreds to thousands of edge servers. The distributed cloud computing network 105 may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. The edge server 120A is the ingress edge server with respect to the client device 110. Other edge servers may be ingress edge servers with respect to other client devices. Although not illustrated in FIG. 1, there may be multiple other network equipment between the edge servers 120A-N such as switch(es), router(s), that may be owned by one or more transit providers. The origin server 130 is connected to the edge server 120N (which may be over a tunnel between the edge server 120N and the origin server 130). In this case, the edge server 120N is an egress or exit edge server for the origin server 130. For instance, traffic destined for a domain that is handled by the origin server 130 go through the edge server 120N.

The edge server 120A receives requests for Internet resources from the client device 110 through the VPN tunnel between the VPN client 122 and the VPN server 125. Assuming that the VPN connection is valid, the edge server 120A processes the requests. The VPN server 125 is operative to decrypt the traffic received on the VPN tunnel to determine the request parameters. The requests may be destined to any number of destinations on the Internet, such as a domain handled by the origin server 130 or a domain handled by the origin server 140. Some of the destinations may be domains that are serviced by the distributed cloud computing network 105 and some of the destinations may be domains that are not serviced by the distributed cloud computing network 105. As an example, the origin server 130 handles a domain that is serviced by the distributed cloud computing network 105 (meaning traffic for that domain is processed through the distributed cloud computing network 105 and provided services as described above); and the origin server 140 handles a domain that is not serviced by the distributed cloud computing network 105.

In an embodiment, processing the requests from the client device 110 includes the edge server 120A determining whether the request can be fulfilled using resources in its cache. For instance, each edge server 120 may include a caching service that is able to serve resources from its cache instead of, for example, querying the origin server or another edge server. For instance, the edge servers 120A-N includes the cache modules 129A-N respectively that are each operative to cache resources and return the cached resources. Before determining to transmit the request to another server of the distributed cloud computing network 105 or to the origin server, the edge server 120A can determine whether the requested resource is available in cache, and if so, return the requested resource without querying the origin server or another server.

The edge server 120A includes the optimized routing module 128A that is configured to intelligently route at least certain requests towards their destination. The optimized route may be based on a set of factors such as speed, reliability, and/or cost. The optimized routes may or may not be the same as the route taken by conventional routing protocols such as standard BGP. In an embodiment, the intelligent routing is based on network probe data to calculate the routes to take to the destination. The network probe data may include probe data for server-to-server links (servers of the distributed cloud computing network) and/or probe data for server-to-origin links. The probe data for server-to-server links and the probe data for server-to-origin links may determine (at a particular time) for each link, the TCP average round trip time (RTT), the TCP minimum RTT, the TCP maximum RTT, the TCP median RTT, and the TCP standard deviation.

The edge server 120A stores optimized routes that it can use to intelligently route requests towards their destination. Each optimized route may include one or more hops, one or more next-hops (e.g., which may be tried randomly for load balancing purposes), and/or one or more alternate paths to be tried if the first path fails. Each hop may be an IP address (e.g., an IPv4 or IPv6 address). If the request cannot be answered using its cache, the edge server 120A accesses the stored optimized routes to determine if an optimized route exists (e.g., based on the destination of the request). The edge server 120A attempts to connect to the best route as defined by the optimized route and if it cannot connect it tries an alternative route (if one exists).

As illustrated in FIG. 1, the optimized routing module 128A of the edge server 120A communicates with the optimized routing module 128N of the edge server 120N. The optimized routing modules may communicate using a layer-4 (e.g., TCP or UDP), mutually-authenticated TLS, point-to-point link. This allows any layer-4 traffic to be communicated between the edge server 120A-N.

In some instances, the edge server 120A may not intelligently route requests towards their destinations. For instance, the edge server 120A may determine that there is not sufficient information to intelligently route requests towards a particular destination (e.g., an optimized route does not exist). In such a case, the edge server 120A includes the origin proxy 127 that proxies the request directly towards the destination origin (e.g., the origin server 140) over a non-optimized route (the default route according to BGP, for instance) through a public network 150 such as the Internet.

In an embodiment, the intelligent routing is not limited to domains that are serviced by the distributed cloud computing network 105. For instance, in some cases, requests for a domain that is not serviced by the distributed cloud computing network 105 may be intelligently routed.

Figure 2:
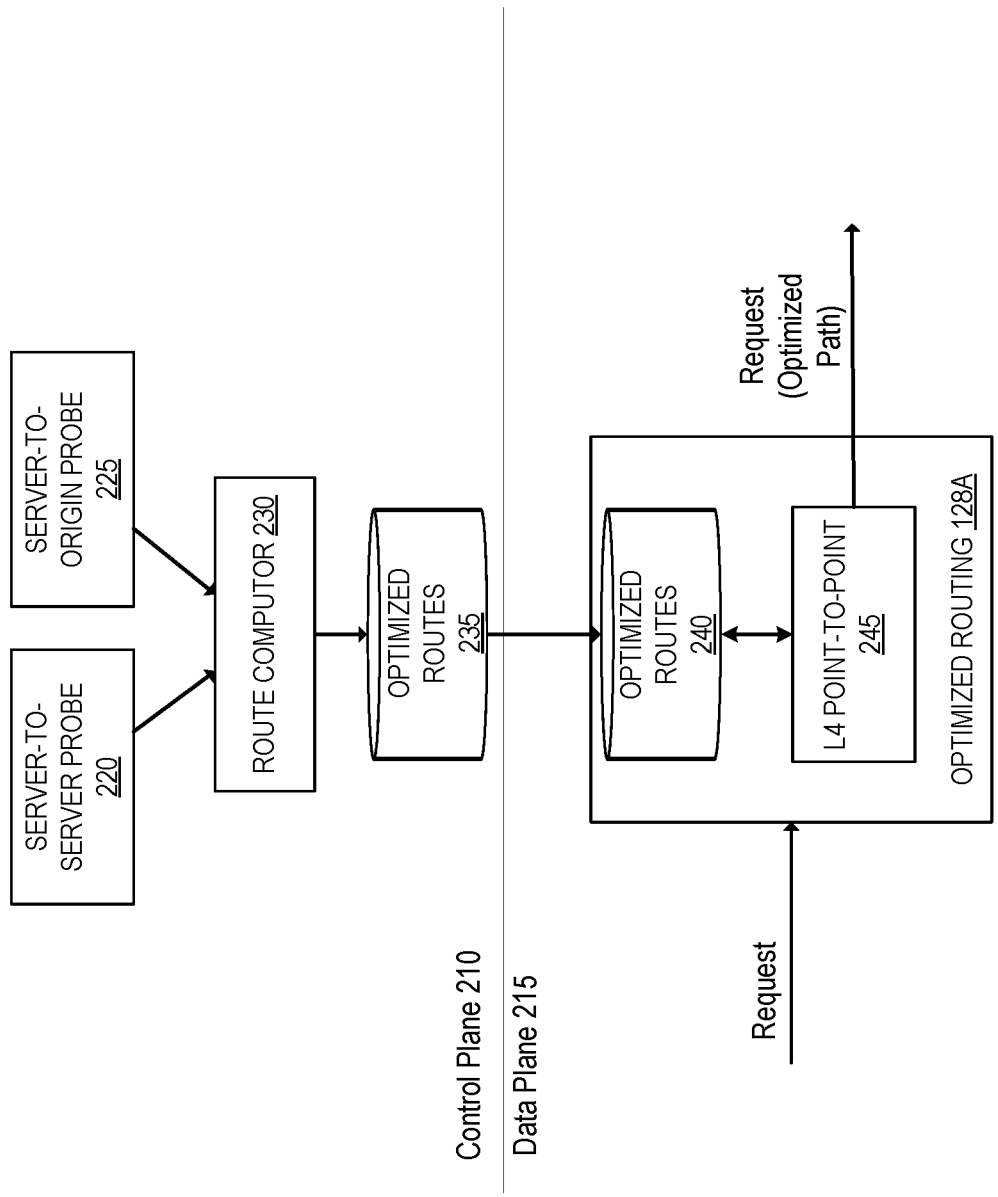
FIG. 2 illustrates an example architecture for intelligently routing requests according to an embodiment.

FIG. 2 illustrates an example architecture for intelligently routing requests according to an embodiment. The intelligent routing is logically split into a control plane 210 and a data plane 215. The control plane 210 computes a routing table based on network problems and stores the computed routes. The routing table is modified/re-computed periodically based on new probe data and/or feedback of real-time traffic performance. The data plane 215 executes the computed, optimized routes. Each optimized route may include one or more hops, one or more next-hops (e.g., which may be tried randomly for load balancing purposes), and/or one or more alternative paths to be tried if the first path fails.

The control plane 210 may be executed on a server separate from the edge servers 120A-N (e.g., as part of a control server) or be part each edge server 120. The control plane 210 includes the server-to-server probe 220 and the server-to-origin probe 225. The server-to-server probe 220 determines, at a particular time, for each server-to-server link (servers of the distributed cloud computing network 105) the TCP average round trip time (RTT), the TCP minimum RTT, the TCP maximum RTT, the TCP median RTT, the TCP standard deviation, bandwidth, and/or packet loss. The server-to-origin probe 225 determines, at a particular time, for each link, the TCP RTT to the origin server, the TCP minimum RTT to the origin server, the TCP maximum RTT to the origin server, the TCP median RTT to the origin server, the TCP standard deviation to the origin server, bandwidth to the origin server, and/or packet loss to the origin server. In cases where the control plane 210 is implemented on a control server separate from the edge servers 120A-N, the control server may transmit a probe request to each edge server 120 to probe traffic to another edge server or an origin. Each origin server 120 may perform a TCP traceroute according to the probe request and transmit the result back to the control server.

The route computer 230 uses the results of the server-to-server probe 220 and the server-to-origin probe 225 to compute optimized routes that are stored in the optimized routes 235. Each optimized route may include one or more hops, one or more next-hops (e.g., which may be tried randomly for load balancing purposes), and/or one or more alternative paths to be tried if the first path fails. Each hop may be an IP address (e.g., an IPv4 or IPv6 address). At least a portion of the optimized routes are communicated to the data plane 215 as optimized routes 240. The optimized routes 240 are used by the optimized routing module 128A (for example) when intelligently routing requests toward their origin. The optimized routing module 128A also includes the L4 point-to-point module 245 that is operative to establish a mutually-authenticated TLS point-to-point link with another edge server in which the request is transited. In an embodiment, HTTP Connect is used in connection between the edge servers. For instance, the L4 point-to-point module may act as an HTTP Connect proxy and execute the HTTP Connect protocol as defined in RFC 2616.

Figure 3:
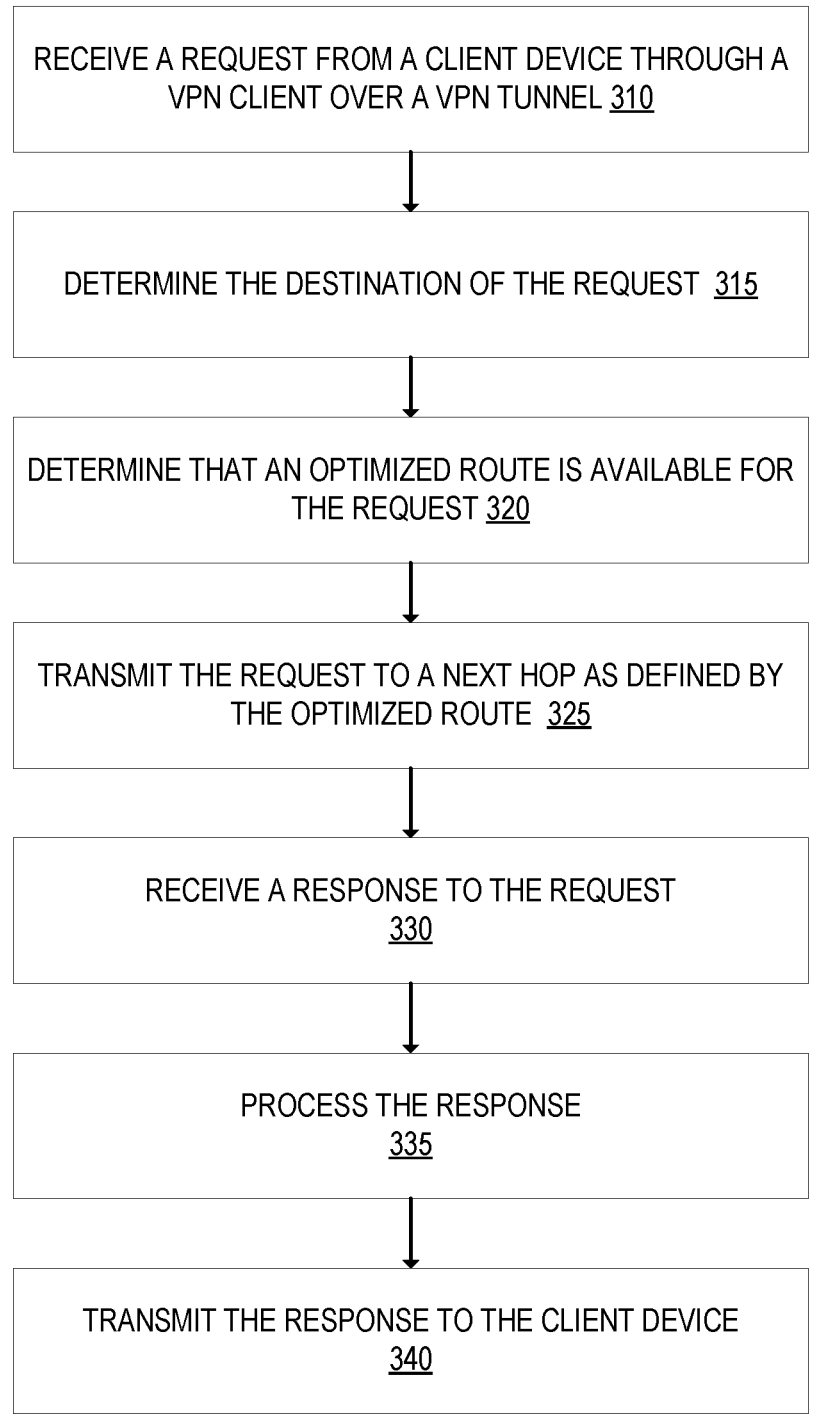
FIG. 3 is a flow diagram that illustrates exemplary operations for a VPN client whose traffic is intelligently routed to its destination according to an embodiment.

FIG. 3 is a flow diagram that illustrates exemplary operations for a VPN client whose traffic is intelligently routed to its destination according to an embodiment. The operations of FIG. 3 are described with reference to the exemplary embodiment of FIG. 1. However, the operations of FIG. 3 can be performed by embodiments other than those discussed with reference to FIG. 1, and the embodiments discussed with reference to FIG. 1 can perform operations different than those discussed with reference to FIG. 3.

At operation 310, the edge server 120A receives data from the client device 110 through the VPN client 122 over a VPN tunnel. The data may be a request such as an HTTP/S request or other Internet request, or other Internet data. The remaining description of FIG. 3 will be with the example that the data is a request. Prior to transmitting the request, the VPN client 122 registers with the system, including generating a keypair (e.g., public key and private key) and transmitting the public key to be stored in a public key server. Prior to accepting a connection with the VPN client 122, the VPN server 125 of the edge server 120A verifies the public key of the VPN client 122. The VPN client 122 may be operative to intercept all outgoing Internet data (e.g., each outgoing request) of the client device 110 and transmit that request to the VPN server 125 of the edge server 120A.

The VPN server 125 decrypts the request and determines the destination of the request at operation 315. The request may be destined to any number of destinations, such as to a domain that is serviced by the distributed cloud computing network or to a domain that is not serviced by the distributed cloud computing network. The routing of the request may be different depending on the destination of the request.

Next, at operation 320, the edge server 120A determines that an optimized route for transmitting the request towards an origin server corresponding with the destination of the request is available. Determining that an optimized route is available may include accessing a storage of optimized routes that are computed by a control plane like the control plane 210. The optimized routes may be based in part on probe data between the edge servers 120 and/or probe data between the edge servers 120A-N and the destination. The optimized routes may be stored according to a pair defined by the receiving edge server (e.g., the edge server 120A in this case) and the subnet of the origin server (the subnet of the destination). In some cases, the optimized route includes another one of the edge servers 120 including an edge server that is connected to the origin server (e.g., the edge server 120N connected to the origin server 130).

In an embodiment, prior to performing operation 320, the edge server 120A may determine whether the request can be fulfilled with its cache (e.g., whether the requested resource is available in its cache). If it can, then the operation 320 may not be performed and the edge server 120A may respond to the request locally. If it cannot, then the operation 320 is performed in an embodiment.

Next, at operation 325, the edge server 120A transmits the request to a next hop as defined by the optimized route. If the next hop is another edge server 120, the edge server 120A may transmit the request to the other edge server 120 using a layer-4 point-to-point link that is a mutually authenticated TLS connection. Prior to transmitting the request, the edge server 120A may add metadata to the request that specifies the destination and the optimized route(s). For instance, a header may be added that specifies the IP address and port of the destination, a header may be added that specifies the request URI, a header may be added that specifies how the request is routed, and optionally a header may be added that specifies that the request is delivered to the origin via a specific edge server. In an embodiment, the optimized route(s) are defined by a one or more path components where each path component has one or more next hop bags, where each next hop bag has one or more next hops, and each next hop is an IP address and port or a literal string of the origin.

The request may transit through one or more other edge servers 120 of the distributed cloud computing network 105 until either the request can be locally fulfilled (e.g., using the cache of that edge server) or until the request is transmitted to the origin server. A response to the request may be transmitted along the same path as the request.

Next, at operation 330, the edge server 120A receives a response to the request and at operation 335 the edge server 120A processes the response. Processing the response may include adding the response to its cache as appropriate. The edge server 120A encrypts the response based on the VPN credentials associated with the VPN tunnel and transmits the encrypted response to the client device over the VPN tunnel at operation 340.

Figure 4:
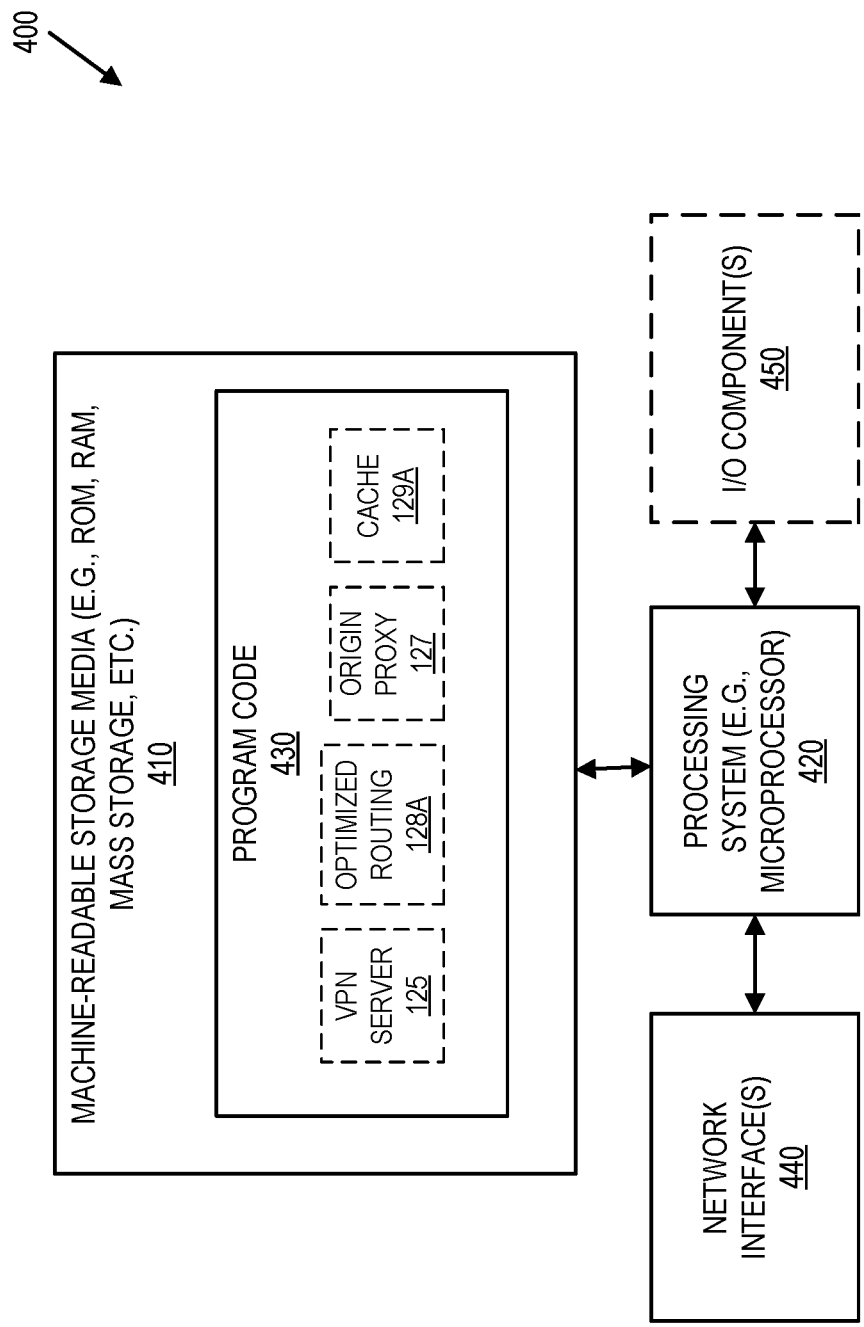
FIG. 4 is a block diagram illustrating a data processing system that can be used in an embodiment.

FIG. 4 illustrates a block diagram for an exemplary data processing system 400 that may be used in some embodiments. One or more such data processing systems 400 may be utilized to implement the embodiments and operations described with respect to the edge servers and/or client device. Data processing system 400 includes a processing system 420 (e.g., one or more processors and connected system components such as multiple connected chips).

The data processing system 400 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 420. For example, the depicted machine-readable storage media 410 may store program code 430 that, when executed by the processor(s) 420, causes the data processing system 400 to execute the VPN server 125, the optimized routing module 128A, the origin proxy 127, the cache module 129A, and/or any of the operations described herein.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 400, and, in certain embodiments, fewer components than that shown in One or more buses may be used to interconnect the various components shown in FIG. 4.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at a first one of a plurality of edge servers of a distributed cloud computing network, a request from a client device over a secure connection between a client application of the client device and one or more of the plurality of edge servers;
calculating, based at least in part on probe data between the plurality of edge servers of the distributed cloud computing network, an optimized route through the distributed cloud computing network for transmitting the request towards an origin server that corresponds with a destination of the request; and
transmitting the request to a next hop as defined by the optimized route.

2. The method of claim 1, wherein the optimized route includes a second one of the plurality of edge servers that is connected to the origin server, and wherein the second one of the plurality of edge servers is an egress server.

3. The method of claim 1, wherein calculating the optimized route through the distributed cloud computing network for transmitting the request towards the origin server that corresponds with the destination of the request further comprises:
transmitting a probe request to each edge server in the plurality of edge servers of the distributed cloud computing network;
receiving the probe data, wherein the probe data is received from one or more origin servers, the probe data including server-to-server probe results and server-to-origin probe results;
calculating the optimized route using the probe data; and
storing the calculated optimized route in an optimized route table.

4. The method of claim 3, wherein the server-to-server probe results includes determining, for each edge server to edge server link, one or more of the following: a Transmission Control Protocol (TCP) average round trip time (RTT), a TCP minimum RTT, a TCP maximum RTT, a TCP median RTT, and a TCP standard deviation.

5. The method of claim 3, wherein the server-to-origin probe results includes determining, for each edge server to origin server link, one or more of the following: a Transmission Control Protocol (TCP) average round trip time (RTT) to a corresponding origin server of an edge server to origin server link, a TCP minimum RTT to the corresponding origin server, a TCP maximum RTT to the corresponding origin server, a TCP median RTT to the corresponding origin server, a TCP standard deviation to the corresponding origin server, bandwidth to the corresponding origin server, and packet loss to the corresponding origin server.

6. The method of claim 1, wherein the optimized route is optimized based on one or more factors, the one or more factors including speed and reliability.

7. The method of claim 1, further comprising:
receiving, at the first one of the plurality of edge servers of the distributed cloud computing network, a second request from the client device over the secure connection;
determining that there is not an optimized route through the distributed cloud computing network for transmission of the second request toward a second origin server that corresponds with a second destination of the second request; and
transmitting the request toward the second origin server via a default route.

8. A non-transitory machine-readable storage medium that provides instructions that, if executed by a processor, will cause said processor to perform operations comprising:
receiving, at a first one of a plurality of edge servers of a distributed cloud computing network, a request from a client device over a secure connection between a client application of the client device and one or more of the plurality of edge servers;
calculating, based at least in part on probe data between the plurality of edge servers of the distributed cloud computing network, an optimized route through the distributed cloud computing network for transmitting the request towards an origin server that corresponds with a destination of the request; and
transmitting the request to a next hop as defined by the optimized route.

9. The non-transitory machine-readable storage medium of claim 8, wherein the optimized route includes a second one of the plurality of edge servers that is connected to the origin server, and wherein the second one of the plurality of edge servers is an egress server.

10. The non-transitory machine-readable storage medium of claim 8, wherein calculating the optimized route through the distributed cloud computing network for transmitting the request towards the origin server that corresponds with the destination of the request further causes said processor to perform operations comprising:
transmitting a probe request to each edge server in the plurality of edge servers of the distributed cloud computing network;
receiving the probe data, wherein the probe data is received from one or more origin servers, the probe data including server-to-server probe results and server-to-origin probe results;
calculating the optimized route using the probe data; and
storing the calculated optimized route in an optimized route table.

11. The non-transitory machine-readable storage medium of claim 10, wherein the server-to-server probe results includes determining, for each edge server to edge server link, one or more of the following: a Transmission Control Protocol (TCP) average round trip time (RTT), a TCP minimum RTT, a TCP maximum RTT, a TCP median RTT, and a TCP standard deviation.

12. The non-transitory machine-readable storage medium of claim 10, wherein the server-to-origin probe results includes determining, for each edge server to origin server link, one or more of the following: a Transmission Control Protocol (TCP) average round trip time (RTT) to a corresponding origin server of an edge server to origin server link, a TCP minimum RTT to the corresponding origin server, a TCP maximum RTT to the corresponding origin server, a TCP median RTT to the corresponding origin server, a TCP standard deviation to the corresponding origin server, bandwidth to the corresponding origin server, and packet loss to the corresponding origin server.

13. The non-transitory machine-readable storage medium of claim 8, wherein the optimized route is optimized based on one or more factors, the one or more factors including speed and reliability.

14. The non-transitory machine-readable storage medium of claim 8, the operations further comprising:
receiving, at the first one of the plurality of edge servers of the distributed cloud computing network, a second request from the client device over the secure connection;

determining that there is not an optimized route through the distributed cloud computing network for transmission of the second request toward a second origin server that corresponds with a second destination of the second request; and transmitting the request toward the second origin server via a default route.

15. A server, comprising:
   a processor; and
   a non-transitory machine-readable storage medium that provides instructions that, if executed by the processor, will cause the server to perform operations including:
      receiving, at a first one of a plurality of edge servers of a distributed cloud computing network, a request from a client device over a secure connection between a client application of the client device and one or more of the plurality of edge servers;
      calculating, based at least in part on probe data between the plurality of edge servers of the distributed cloud computing network, an optimized route through the distributed cloud computing network for transmitting the request towards an origin server that corresponds with a destination of the request; and
      transmitting the request to a next hop as defined by the optimized route.

16. The server of claim 15, wherein the optimized route includes a second one of the plurality of edge servers that is connected to the origin server, and wherein the second one of the plurality of edge servers is an egress server.

17. The server of claim 15, wherein calculating the optimized route through the distributed cloud computing network for transmitting the request towards the origin server that corresponds with the destination of the request further comprises:
   transmitting a probe request to each edge server in the plurality of edge servers of the distributed cloud computing network;
   receiving the probe data, wherein the probe data is received from one or more origin servers, the probe data including server-to-server probe results and server-to-origin probe results;
   calculating the optimized route using the probe data; and
   storing the calculated optimized route in an optimized route table.

18. The server of claim 17, wherein the server-to-server probe results includes determining, for each edge server to edge server link, one or more of the following: a Transmission Control Protocol (TCP) average round trip time (RTT), a TCP minimum RTT, a TCP maximum RTT, a TCP median RTT, and a TCP standard deviation.

19. The server of claim 17, wherein the server-to-origin probe results includes determining, for each edge server to origin server link, one or more of the following: a Transmission Control Protocol (TCP) average round trip time (RTT) to a corresponding origin server of an edge server to origin server link, a TCP minimum RTT to the corresponding origin server, a TCP maximum RTT to the corresponding origin server, a TCP median RTT to the corresponding origin server, a TCP standard deviation to the corresponding origin server, bandwidth to the corresponding origin server, and packet loss to the corresponding origin server.

20. The server of claim 15, wherein the optimized route is optimized based on one or more factors, the one or more factors including speed and reliability.

21. The server of claim 15, the operations further comprising:
   receiving, at the first one of the plurality of edge servers of the distributed cloud computing network, a second request from the client device over the secure connection;
   determining that there is not an optimized route through the distributed cloud computing network for transmission of the second request toward a second origin server that corresponds with a second destination of the second request; and
   transmitting the request toward the second origin server via a default route.

* * * * *